(12) United States Patent
He et al.

(10) Patent No.: US 9,007,418 B2
(45) Date of Patent: Apr. 14, 2015

(54) CAPTURING VIDEO THROUGH A DISPLAY

(71) Applicant: Cisco Technology, Inc., San Jose, CA (US)

(72) Inventors: Hao He, Sunnyvale, CA (US); Nick Pafundi, San Jose, CA (US); Ian K. Kono, San Jose, CA (US); Mithilesh Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 13/688,512

(22) Filed: Nov. 29, 2012

(65) Prior Publication Data
US 2014/0146127 A1 May 29, 2014

(51) Int. Cl.
*H04N 7/14* (2006.01)
(52) U.S. Cl.
CPC ..................................... *H04N 7/144* (2013.01)

(58) Field of Classification Search
USPC ............................................ 348/14.16, 14.01
See application file for complete search history.

(56) References Cited

U.S. PATENT DOCUMENTS

| | | |
|---|---|---|
| 4,965,819 A | 10/1990 | Kannes |
| 5,400,069 A | 3/1995 | Braun et al. |
| 7,808,540 B2 * | 10/2010 | Cok .......................... 348/333.01 |
| 2007/0002130 A1 | 1/2007 | Hartkop |
| 2007/0120879 A1 | 5/2007 | Kanade et al. |
| 2009/0009628 A1 | 1/2009 | Janicek |
| 2010/0309016 A1 * | 12/2010 | Wendt et al. ............. 340/825.22 |
| 2012/0182437 A1 | 7/2012 | Dudek et al. |

* cited by examiner

*Primary Examiner* — Stella Woo
(74) *Attorney, Agent, or Firm* — Edell, Shapiro & Finnan, LLC

(57) ABSTRACT

An image is displayed from a transparent display according to a first signal. Light passing through the display is received, and a second signal is generated from the received light. A third signal is generated from the first signal and the second signal by eliminating data in the second signal corresponding to the image.

20 Claims, 6 Drawing Sheets

CAPTURING VIDEO THROUGH A DISPLAY

TECHNICAL FIELD

The present disclosure relates to capturing images through a display, and in particular, capturing images for video conferencing applications.

BACKGROUND

When video conferencing with a remote party, the communication is more natural when the participants are able to look each other "in the eye" through the video conference screen, just as they would in an in-person meeting. Unfortunately, proper eye contact can be difficult to achieve as the video conference camera is generally not located where the user naturally wants to look.

Specifically, cameras may be mounted above or next to the video conference display. Accordingly, if a video-conference participant looks directly at the display, when their image is displayed to the remote participant, they will not appear to be looking directly at the remote participant. Alternatively, if a participant looks directly at the camera, they will not be looking directly at the image of the remote participants.

DESCRIPTION OF EXAMPLE EMBODIMENTS

Overview

An image is displayed from a transparent display according to a first signal. Light passing through the display is received, and a second signal is generated from the received light. A third signal is generated from the first signal and the second signal by eliminating data in the second signal corresponding to the image.

Example Embodiments

Figure 1:
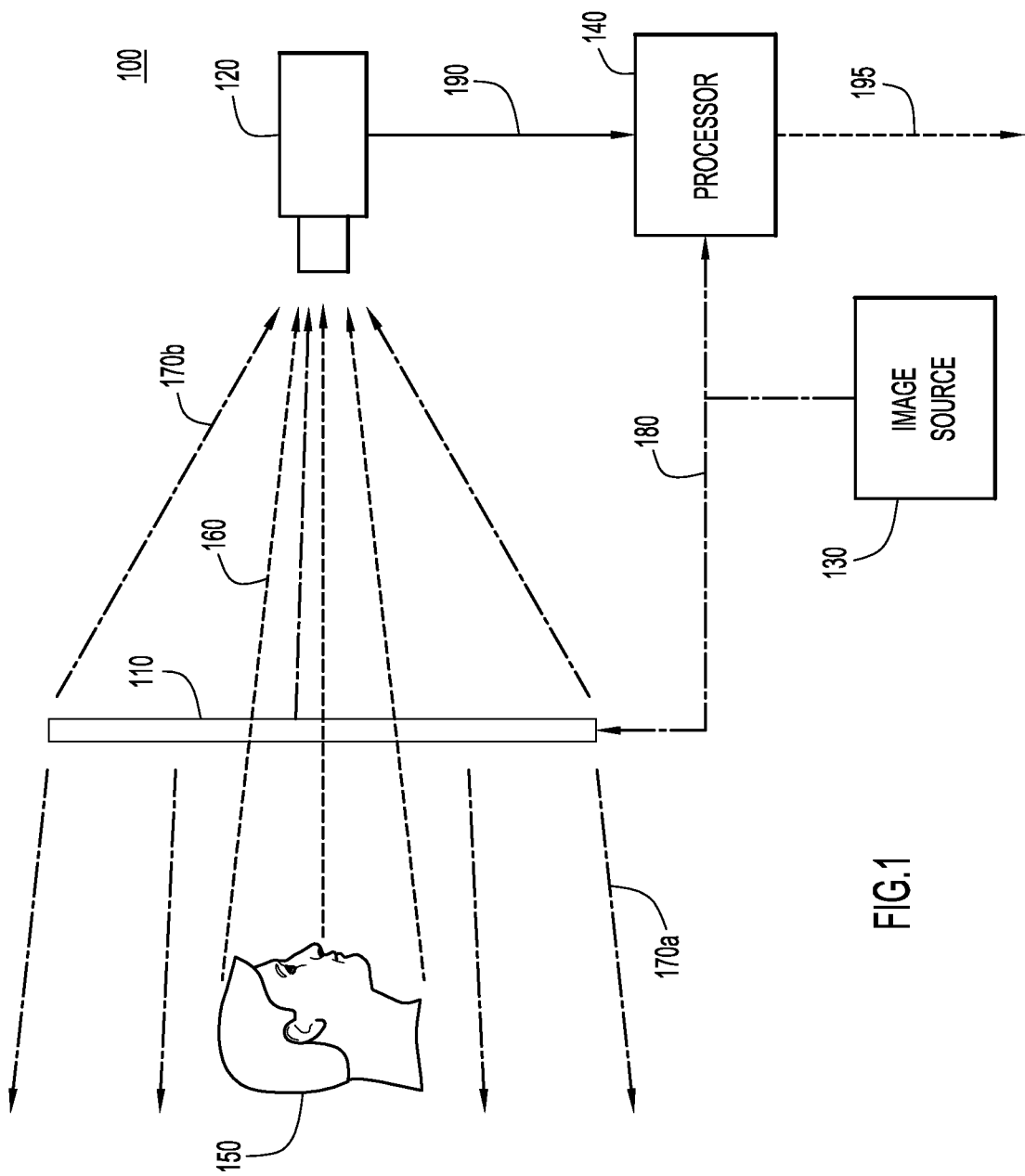
FIG. 1 depicts an example display apparatus configured to capture images through a display.

Depicted in FIG. 1 is a block diagram of an apparatus 100 that may be used to capture an image. The apparatus 100 may be suitable for use as an endpoint in video conference system. The apparatus 100 contains a transparent display 110, an image sensor or camera 120, an image source 130 and a processor 140. Camera 120 is arranged behind the transparent display 110 in order to capture an image of the environment external the display, in this case person 150. Specifically, light 160 containing information corresponding to person 150 is able to pass through display 110 due to the transparent nature of display 110. For example, display 110 may be implemented in an organic light emitting diode (OLED) display. The image source 130 may be a video decoder configured to decode an encoded video signal for presentation from display 110.

An OLED is comprised of an electroluminescent layer composed of an organic compound which emits light in response to an electric current. The electroluminescent layer is sandwiched between two electrodes which provide the electric current to cause the electroluminescent layer to emit light. The two electrodes and the electroluminescent layer may be made from transparent compounds. Accordingly, a display comprised of a plurality of transparent OLED pixels can be constructed to form a substantially transparent display. Accordingly, light 160 is able to pass through display 110, carrying with it image information for person 150 that is registered at camera 120.

Yet, as light 160 is passing through display 110, display 110 is also projecting light 170. Specifically, image source 130 provides image signal 180 to display 110. Display 110 controls its individual pixels to project an image corresponding to signal 180. Some of the projected light will project in a forward direction as light 170a, allowing viewers, such as person 150 to view the image. Additionally, some of the light 170b will travel through display 110 in a backwards direction. Light 170b may comprise reflected light which was originally projected in the forward direction, such as light reflected from a glass covering the front of the display, and/or light which was initially emitted by the pixels of display 110 in the backwards direction. Light 170b will be registered at camera 120 along with the light 160 corresponding to the image of person 150.

Camera 120 generates an image signal 190 which corresponds to the light received by the camera, and therefore, image signal 190 will correspond to both light 160 and light 170b. Accordingly, the portions of signal 190 that correspond to light 160 may not be easily distinguished from the portions of signal 190 corresponding to light 170b. If the desired image is that of person 150, the presence of light 170b will degrade any image of individual 150, or worse, may cause any image of individual 150 to be completely indistinguishable when an image corresponding to signal 190 is displayed. In order to provide a signal representing an acceptable image of individual 150, signal 190 from camera 120 and signal 180 from image source 130 are both provided to image processor 140. The processor 140 may also have encoding capabilities to encode a resulting video signal for transport over a network.

By providing image signal 180 to image processor 140, processing can be applied to signal 190 which accounts for the presence of light 170b, allowing image processor 140 to generate a third image signal, signal 195, which when displayed will provide an acceptably clear image of person 150. In effect, because signal 180 corresponds to the projected light 170, providing image processor 140 with image signal 180 allows image processor 140 to determine which portions of image signal 190 correspond to light 170b, and to "subtract" this information from signal 190. The result of the "subtraction" will be third image signal 195 which, when displayed, will result in an acceptable image of person 150. While the description herein uses terms like "subtract" and "subtraction" to describe the processing performed by image processor 140, it should be understood that the processing may comprise other operations as well. For example, adding, enhancing, extrapolating, interpolating, and otherwise modifying signal 190 may be performed in response to signal 180 to generate a signal 195 which provides an adequate image of person 150 when displayed.

In order to determine the correct processing to be applied by image processor 140, image display apparatus 100 may undergo a calibration process. For example, image source 130 may provide a series of test image signals which are to be projected by display 110 in a in a dark, but not completely dark room. Because there will be little light in the dark room other than what is projected by the display 110, the light received by camera 120 will be comprised almost completely by light 170b. Accordingly, image processor 140 may be able to determine the correct image processing that should be applied to signal 190 when operating in a brighter room. For example, the signal received from the camera 120 in the dark room is an indication of the information that should be "subtracted" from image signal 190 when the display device is placed in a normally illuminated room.

Similarly, the performance of display 110 and camera 120 may be monitored in order to ensure that the correct image processing is applied by image processor 140. For example, the pixels of display 110 may degrade over time, emitting less light, or emitting light at a slightly different wavelength. Accordingly, the luminosity and color of the light emitted by display 110 may be monitored. By monitoring the performance of display 110, image processor 140 may compensate for these changes in display performance. Specifically, image processor 140 may modify the image processing algorithms used to generate signal 195 in response to the monitoring. Similar monitoring may take place with regard to the performance of camera 120. The monitoring may take place continually during the operation of apparatus 100 by comparing the actual displayed image to signal 180 and/or periodic recalibration of the apparatus 100 may be performed.

Figure 2:
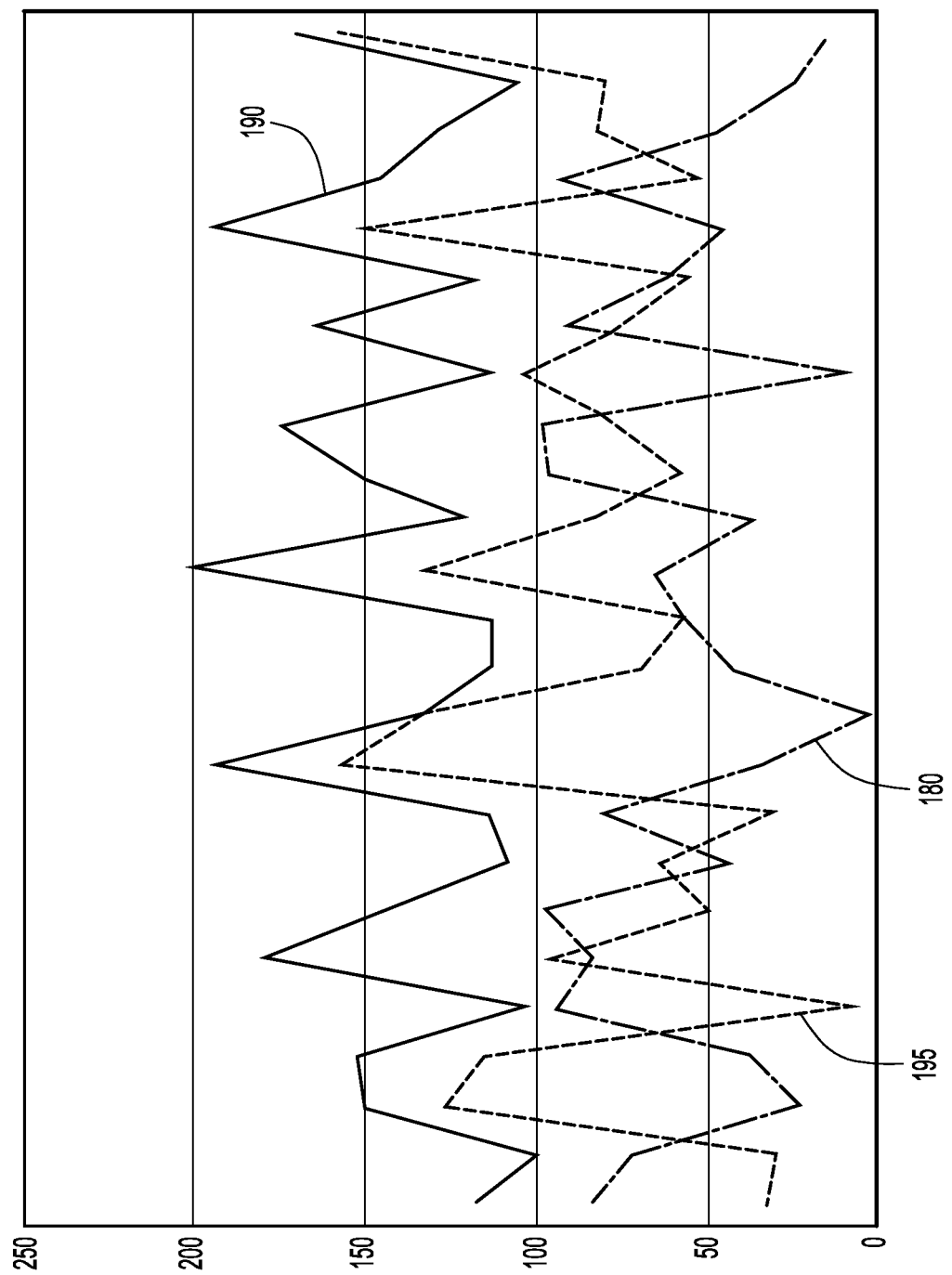
FIG. 2 depicts three image signals utilized by example display devices.

Turning to FIG. 2, depicted therein are sample graphs of signals 180, 190 and 195. Specifically, signal 180 represents an intensity signal for a single component of a video signal, such as an intensity signal for the green component of a video signal. Signal 190 represents an intensity signal for the green component a video signal produced by camera 120, while signal 195 represents an intensity signal for the green component of a video signal produced by image processor 140. According to the example of FIG. 2, a very simplified example image processing is applied to signal 190 according to signal 180 in order to produce signal 195. According to this simplified example, the intensity value of signal 180 is subtracted from a corresponding intensity value of signal 190, resulting in signal 195, effectively eliminating signal 180 from signal 190.

Of course, in a more complex example there may not be a direct one-to-one relationship between the intensity value of signal 180, and the intensity value that should be subtracted from signal 190. Furthermore, the type and amount of processing applied to signals 180 and 190 may be based on a number of factors, such as the camera's field of view, the camera's focal length at the time signal 190 was generated, the brightness of the room in which the display apparatus is located, as well as other considerations. For example, image processor 140 may apply processing to increase the signal-to-noise ratio of the signals during the image processing.

Figure 3:
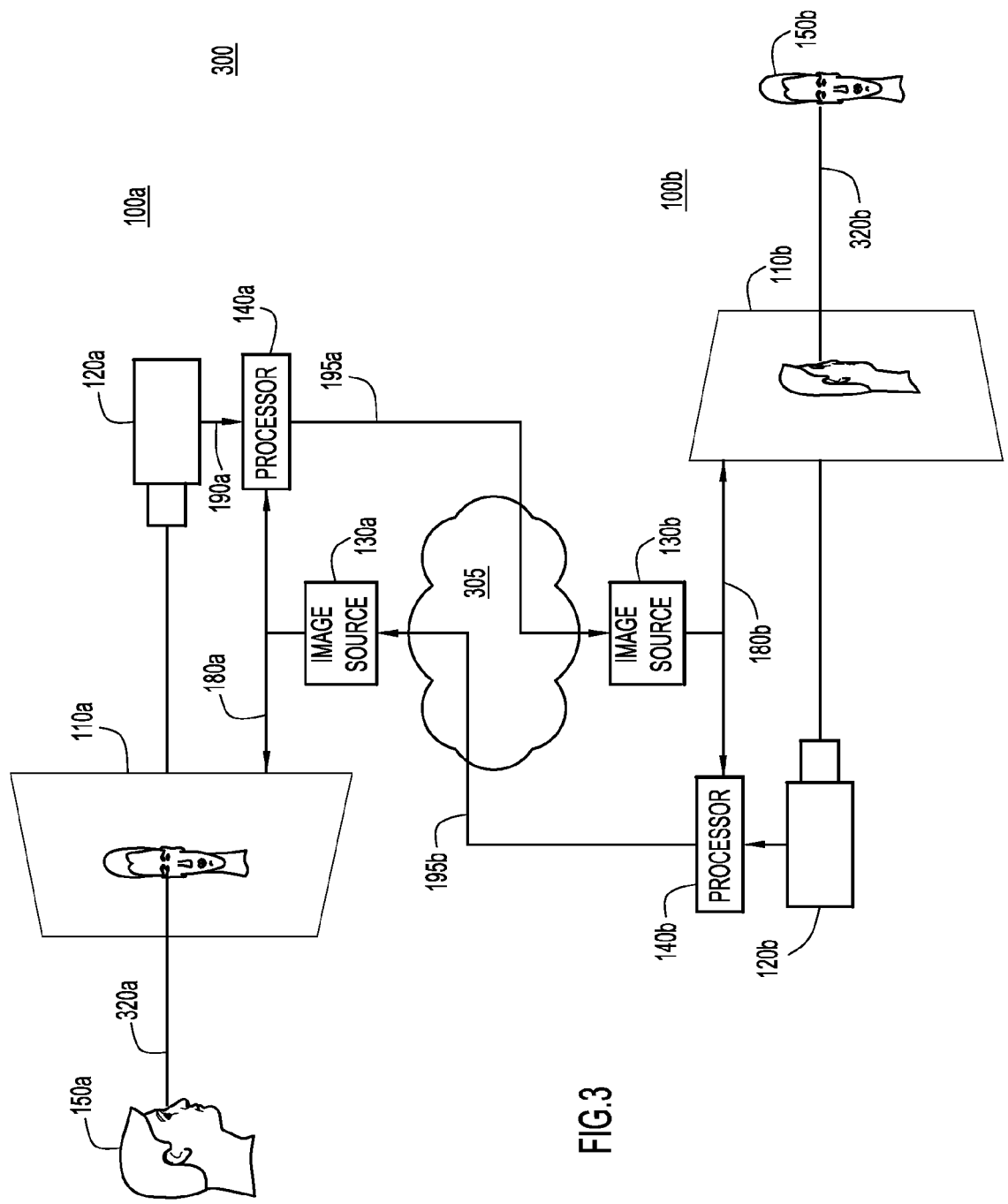
FIG. 3 depicts a system of display devices involved in video conference session.

With reference now to FIG. 3, depicted therein is a video conference system 300. System 300 comprises first and second apparatuses (devices) 100a and 100b, e.g., at first and second endpoints. Apparatus 100a and apparatus 100b may be analogous to apparatus (endpoint) 100 shown in FIG. 1. The apparatus 100a is connected to apparatus 100b through network 305. Specifically, the output signal 195a from apparatus 100a is sent through network 305 to the image source 130b of apparatus 100b. Accordingly, the output signal 195a serves as the source of the image projected by display 110b of apparatus 100b. Similarly, the output signal 195b of apparatus 100b is sent through network 305 to image source 130a of apparatus 100a. Accordingly, the output signal 195b provides the image signal for the image being projected by display 110a. In other words, apparatus 100a is acquiring an image of individual 150a, which is being displayed by apparatus 100b, and 100b is acquiring an image of individual 150b which is being displayed by apparatus 100a, thereby facilitating a two-way video conference between individual 150a and 150b. Of course, signals sent between apparatuses 100a and 100b through network 305 may also comprise audio signals to facilitate conversation between individual 150a and individual 150b. As explained above, there are video encoding and decoding capabilities at each endpoint so that each endpoint encodes outgoing video, transported over network 305 and decodes incoming encoded video.

Because camera 120a is located behind display 110a, and camera 120b is located behind display 110b, the image of individual 150b projected by display 110a can appear to be making direct eye contact with individual 150a, as illustrated by sight line 320a. Similarly, the image of individual 150a projected by display 110b can appear to be making direct eye contact with individual 150b, as illustrated by sight line 320b. Accordingly, a system of endpoints such as those depicted in FIG. 3 can facilitate more natural communication between remote individuals.

Figure 4:
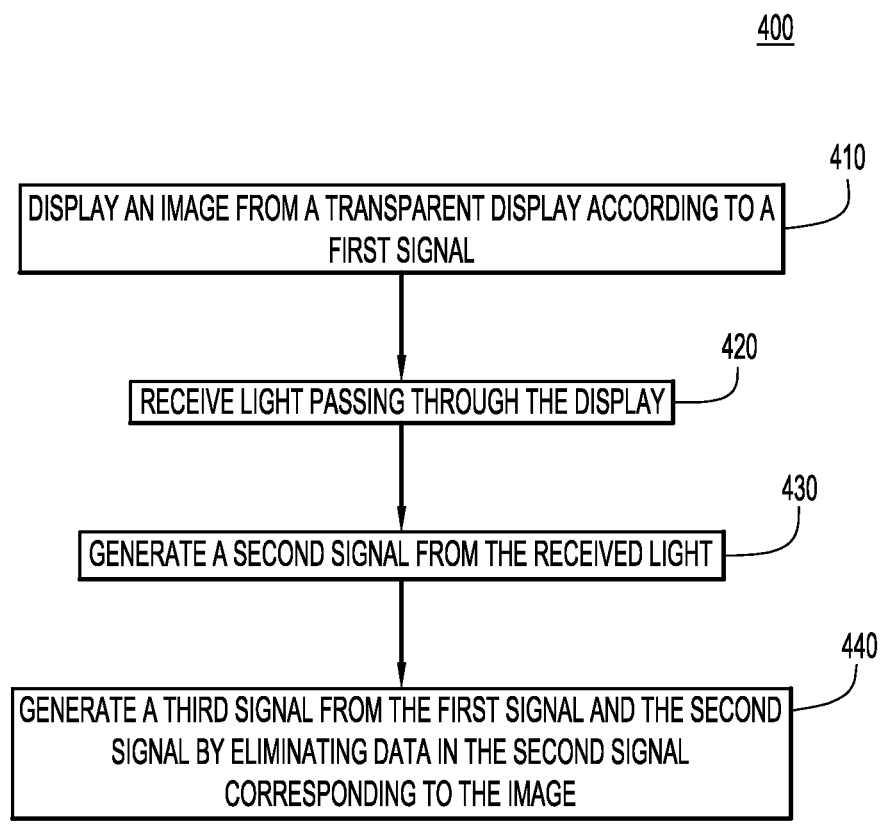
FIG. 4 is a flowchart illustrating a first example method of capturing images through a display.

Turning to FIG. 4, depicted therein is a flowchart 400 illustrating a process for capturing video through a display. The process begins in step 410 in which an image is displayed on, or projected from, a transparent display. The image is displayed according to a first signal. In step 420, light passing through the display is received. The light received through the display may be received concurrently with the display of the image on the transparent display. The light may be received at an image sensor, such as a camera. Furthermore, the light received through the display may comprise light corresponding to the displayed image and light corresponding to an image external to the display, such as an image of an individual or an image of the room in which a display apparatus is located.

In step 430, a second signal is generated from the received light. Finally, in step 440, a third signal is generated from the first signal and the second signal by eliminating data in the second signal corresponding to the displayed image.

Figure 5:
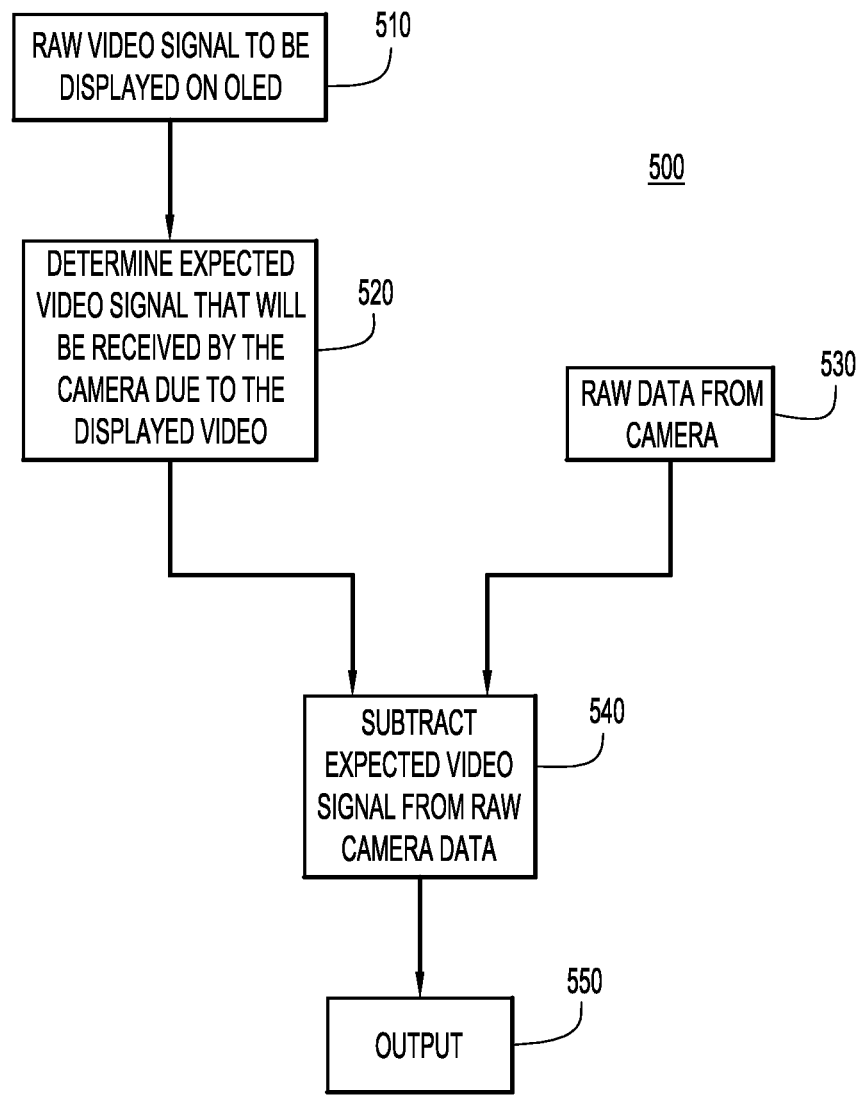
FIG. 5 is a flowchart illustrating a second example method of capturing images through a display.

Turning to FIG. 5, depicted therein is a flowchart 500 illustrating an example of the process illustrated in FIG. 4 from the perspective of an image processing device. In step 510, a raw video signal for display on an OLED display is received. In step 520, an expected video signal is determined. The expected video signal is the signal that is expected to be received by a camera located behind a transparent OLED display due to the display of the raw video signal. For example, the expected signal may comprise the signal that would be received at a camera located behind the OLED display if the camera and display were located in a dark, but not completely dark room.

In step 530, raw data is received from the camera. According to this example, the raw data may comprise a video signal received from the camera that differs from the expected video signal. For example, if the display and camera are located in a room receiving normal office lighting, the video signal received from the camera will differ from the expected signal.

In step 540, the expected video signal is subtracted from the raw camera data. For example, the expected video signal, which comprises the image signal that would be expected to be received at the camera if the camera and display were located in a dark but not completely dark room, is subtracted from the actual video signal received from the camera. By subtracting the expected video signal from the video signal received from the camera, the portions of the video received from the camera that correspond to the image displayed on the OLED display are removed from the video signal. Finally, in step 550, the image signal resulting from the extraction of the expected video signal from the signal received from the camera is output. This output signal will correspond to an image of the environment external to the display undisturbed by the light emitted by the OLED display.

Figure 6:
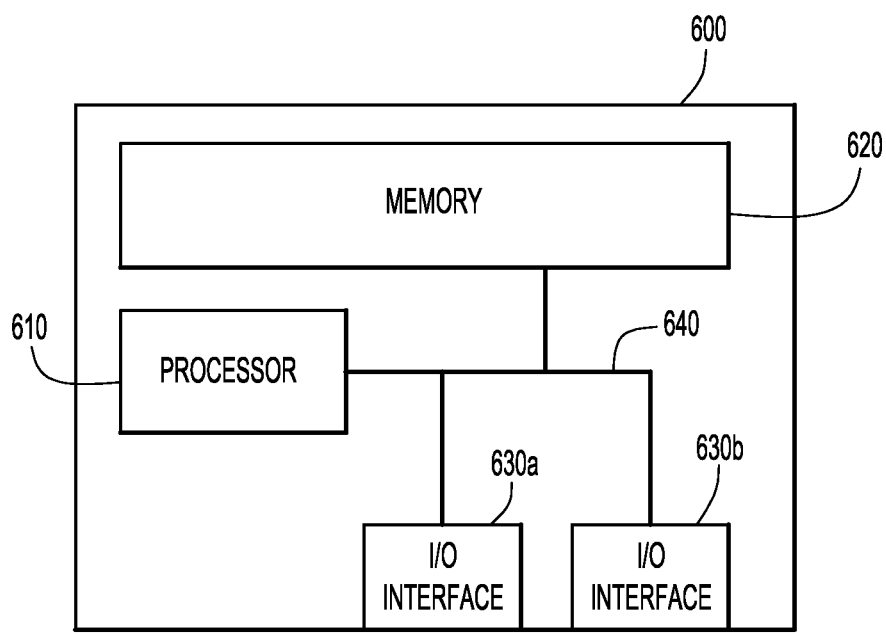
FIG. 6 is a block diagram illustrating an image processing device utilized in an example display device.

With reference now made to FIG. 6, depicted therein is an image processing device 600, comprising a processor 610, a memory 620, input/output (I/O) interfaces 630a and 630b, and bus 640. The image processing device 600 may be configured to perform the functions of image source 130 and image processor 140, in a single device. The processor 610 is, for example, a microprocessor or microcontroller that executes instructions contained in the memory 620. Memory 620 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 620 may comprise one or more tangible (non-transitory) computer readable storage media (e.g., a memory device) encoded with software comprising computer executable instructions and when the software is executed (by the processor 610), it is operable to perform the operations described herein in connection with FIGS. 1-5.

Accordingly, the processor 610 may supply a video signal to a display through one of the I/O interfaces 630a and 630b. Similarly, the image processing device 600 may receive a video signal from a camera through the one of the I/O interfaces 630a and 630b. Additionally, the I/O interfaces may serve as network interfaces for sending and receiving video signals over a network as, for example, described in reference to FIG. 3.

The above description is intended by way of example only.

What is claimed is:

1. A method comprising:
    calibrating a transparent display and an image sensor in a dark room to generate calibration data;
    displaying an image from the transparent display according to a first signal;
    receiving light passing through the display at the image sensor;
    generating a second signal from the received light;
    generating a third signal from the first signal and the second signal by eliminating data in the second signal corresponding to the image, wherein the eliminating of the data is performed in response to the calibration data.

2. The method of claim 1, wherein displaying the image on the transparent display comprises displaying the image on an organic light emitting diode display.

3. The method of claim 1, wherein:
    displaying the image comprises projecting light corresponding to the image in a first direction, and
    receiving the light comprises receiving light which passes through the display in a second direction opposite the first direction.

4. The method of claim 3, wherein receiving the light comprises arranging the image sensor on a side of the display opposite to which the light is projected.

5. The method of claim 1, further comprising transmitting the third signal as part of a video conferencing session.

6. The method of claim 1, wherein receiving light passing through the display comprises receiving light from the display and light from an environment external to the display.

7. The method of claim 1, wherein generating the third signal comprises monitoring performance characteristics of the display.

8. The method of claim 7, wherein monitoring performance characteristics of the display comprises monitoring luminosity and coloring of a displayed image compared to data contained in the first signal.

9. The method of claim 7, wherein generating the third signal comprises modifying an algorithm used to generate the third signal in response to the monitoring.

10. The method of claim 7, further comprising modifying the calibration data in response to the monitoring.

11. An apparatus comprising:
    a transparent display configured to project an image according to a first signal;
    an image sensor configured to receive light passing through the display and to generate a second signal from the received light; and
    a processor coupled to the image sensor, wherein the processor is configured to:
        generate and store calibration data by calibrating the transparent display and the image sensor in a dark room;
        receive the first and second signals; and
        generate a third signal from the first signal and the second signal by eliminating data in the second signal corresponding to the image, wherein the eliminating of the data is performed in response to the calibration data.

12. The apparatus of claim 11, wherein the transparent display comprises an organic light emitting diode display.

13. The apparatus of claim 11, wherein the image sensor is arranged on a side of the display opposite a direction in which the image is displayed.

14. The apparatus of claim 11, wherein the processor is further configured to monitor performance characteristics of the display.

15. The apparatus of claim 14, wherein the processor is further configured to generate the third signal based on monitored performance characteristics of the display.

16. A non-transitory computer readable medium encoded with instructions that, when executed by a processor, cause the processor to:
    generate and store calibration data by calibrating a transparent display and an image sensor in a dark room;
    receive a first signal corresponding to an image projected by the transparent display;
    receive a second signal corresponding to light that passes through the transparent display and is received by the image sensor; and
    generate a third signal from the first signal and the second signal by eliminating data in the second signal corresponding to the image, wherein the eliminating of the data is performed in response to the calibration data.

17. The computer readable medium of claim 16, wherein the instructions cause the processor to receive the first signal from an organic light emitting diode display.

18. The computer readable medium of claim 16, wherein the instructions cause the processor to receive the second signal from an image sensor arranged on a side of the display opposite a direction in which the image is displayed.

19. The computer readable medium of claim 16, wherein the instructions further cause the processor to monitor performance characteristics of the display.

20. The computer readable medium of claim 19, wherein the instructions further cause the processor to generate the third signal in response to the monitoring.

* * * * *